United States Patent [19]

Schirmer

[11] Patent Number: 5,084,324
[45] Date of Patent: Jan. 28, 1992

[54] MICRO-BUBBLE LAMINATE WITH PERFORATED SUBSTRATE

[75] Inventor: Henry G. Schirmer, Spartanburg, S.C.

[73] Assignee: W. R. Grace & Co.-Conn., Duncan, S.C.

[21] Appl. No.: 506,645

[22] Filed: Apr. 6, 1990

Related U.S. Application Data

[62] Division of Ser. No. 398,804, Aug. 25, 1989, Pat. No. 4,950,354.

[51] Int. Cl.$^5$ .................. B32B 3/12; B32B 3/26
[52] U.S. Cl. .................... 428/139; 428/137; 428/138; 428/178; 428/166; 428/518; 428/523; 428/910
[58] Field of Search ............ 428/137, 138, 178, 139, 428/166, 518, 523, 910

[56] References Cited

U.S. PATENT DOCUMENTS

| | | | |
|---|---|---|---|
| 3,142,599 | 7/1964 | Chavannes | 156/210 |
| 3,208,898 | 9/1965 | Chavannes et al. | 156/196 |
| 3,280,428 | 10/1966 | Watts, Jr. | 18/19 |
| 3,285,793 | 11/1966 | Chavannes | 156/210 |
| 3,508,992 | 4/1970 | Chavannes | 156/209 |
| 3,586,565 | 6/1971 | Fielding | 156/210 |
| 3,616,155 | 10/1971 | Chavannes | 161/119 |
| 3,812,001 | 5/1974 | Ryan | 428/178 |
| 3,834,487 | 9/1974 | Hale | 428/178 X |
| 3,881,491 | 5/1975 | Whyte | 428/178 X |
| 3,923,578 | 12/1975 | Hair | 156/252 |
| 3,953,273 | 4/1976 | Faller | 156/224 |
| 4,181,548 | 1/1980 | Weingarten | 156/145 |
| 4,192,699 | 3/1980 | Lewicki et al. | 156/145 |
| 4,228,215 | 10/1980 | Hein, III et al. | 428/178 X |
| 4,314,865 | 2/1982 | Ottaviano | 428/178 X |
| 4,415,398 | 11/1983 | Ottaviano | 156/470 |
| 4,439,478 | 3/1984 | Ferguson et al. | 428/137 |
| 4,576,669 | 3/1986 | Caputo | 156/145 |
| 4,579,516 | 4/1986 | Caputo | 425/388 |
| 4,735,843 | 4/1988 | Noda | 428/137 |
| 4,804,565 | 2/1989 | Rust | 428/178 X |

FOREIGN PATENT DOCUMENTS

| | | |
|---|---|---|
| 1186201 | 4/1985 | Canada . |
| 1191437 | 8/1985 | Canada . |
| 0908579 | 10/1962 | United Kingdom . |

*Primary Examiner*—James J. Seidleck
*Assistant Examiner*—William P. Watkins, III
*Attorney, Agent, or Firm*—William D. Lee, Jr.; Jennifer L. Skord; Mark B. Quatt

[57] ABSTRACT

A micro-bubble laminate is made by drawing a heated thermoplastic film through the perforations of a perforated substrate laminated to the film. The bubbles may then be trapped by laminating an additional thermoplastic layer to the laminate construction. This laminate may be used in producing air cushioning or bubble laminates, and the inventive process avoids the intricate and expensive machinery typically used in the production of air cushioning materials.

14 Claims, 2 Drawing Sheets

MICRO-BUBBLE LAMINATE WITH PERFORATED SUBSTRATE

This is a divisional application of application Ser. No. 398,804, filed on Aug. 25, 1989, now U.S. Pat. No. 4,450,354, Aug. 21, 1990.

BACKGROUND OF THE INVENTION

It is well known that "bubble" films, laminates, and packaging, i.e. film or film combinations where air or another gas is entrapped at regular intervals between two or more sheets of film, are useful in certain packaging applications. These bubble constructions are sometimes referred to as air-cushioning materials. These constructions are particularly useful where shock absorbance, softness, or physical or thermal insulation is required.

Many patents have issued in this general technology.

U.S. Pat. No. 4,576,669 (Caputo) discloses an apparatus and method for producing air-cushioning material in which a first film is heated and thermoformed on a cooled roll with cavities formed therein, and a second film is heated on a heated roll and heat-sealed to the first film.

U.S. Pat. No. 4,579,516 (Caputo) discloses a forming roller useful as the cooled roller for thermoforming a first film as described in U.S. Pat. No. 4,576,669.

U.S. Pat. No. 4,192,699 (Lewicki et al) discloses a method of making inflatable cellular assemblies of plastic material which includes the use of multiple sheets of material.

U.S. Pat. No. 4,415,398 (Ottaviano) discloses air cell cushioning dunnage formed from two sheets of flexible plastic material, one of the sheets having been embossed to define cells with entrapped air.

U.S. Pat. No. 3,508,992 (Chavannes) discloses a method for making cellular material using multiply laminates with at least one of the laminates embossed prior to sealing the laminates together.

U.S. Pat. No. 3,142,599 (Chavannes) discloses a method for making laminated cushioning material, and sealed elements in hemispherical form.

U.S. Pat. No. 3,208,898 (Chavannes et al) discloses an embossed, laminated article having an embossed or molded plastic layer, a sealing layer, a plurality of cells, and a second sealing layer sealed to the top of the cells.

U.S. Pat. No. 3,285,793 (Chavannes) discloses an embossed cushioning material made by joining two films of plastic together, one of the films being embossed in a hemispherical shape.

U.S. Pat. No. 3,586,565 (Fielding) discloses a first sheet sealed to a second embossed sheet to form a plurality of hermetically sealed cells.

U.S. Pat. No. 3,616,155 (Chavannes) discloses a cellular product formed of multiply laminates wherein at least one of the laminates is embossed and the other laminate seals the embossment. Each laminate has a plastic base and a gas-impervious coating.

Canadian Patent No. 1,191,437 (Ottaviano) discloses a cushioning dunnage material of a first single stratum film, embossed to form air cells therein, and a second film adhered to the first film.

Canadian Patent No. 1,186,204 (Ottaviano) discloses a cushioning dunnage material of a first multilayer film, embossed to form air cells therein, and a second film adhered to the first film. Great Britain Patent No. 908,579 discloses a laminated multi-cellular sheet packaging material made by embossing a first web on an embossing drum, and adhering a second web to the first web.

U.S. Pat. No. 4,181,548 (Weingarten) discloses a three-layer laminated plastic cushioning material having a flat central layer with sealed air pockets on both sides of the central layer.

SUMMARY OF THE INVENTION

A method of making a micro-bubble laminate comprises laminating a perforated substrate to a first thermoplastic film; passing the laminate through heated pinch rolls; heating the first thermoplastic film; drawing the heated first thermoplastic film through the perforations in the perforated substrate to create bubbles; and adhering a second thermoplastic film to the first thermoplastic film to trap the air in the bubbles.

In another aspect of the present invention, a micro-bubble laminate comprises a perforated substrate; a first thermoplastic film adhered to the perforated substrate, and formed into gas bubbles protruding up through the perforations of the perforated substrate; and a second thermoplastic film adhered to the surface of the first thermoplastic film opposite the perforated substrate.

BRIEF DESCRIPTION OF THE DRAWINGS

The invention may be further understood by reference to the drawing figures in which.

DESCRIPTION OF THE PREFERRED EMBODIMENTS

Figure 1:
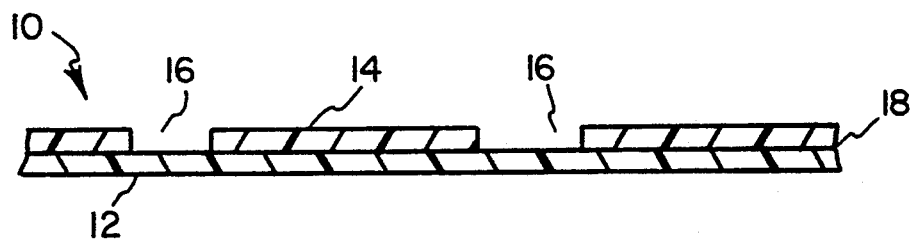
FIG. 1 through FIG. 3 graphically show cross-sectional views of the laminate of the present invention during different phases of its production.

Referring to FIG. 1, a laminate construction 10 includes a perforated substrate 14 and a first thermoplastic film 12.

Perforated substrate 14 may be any suitable sheet-like web of metallic or thermoplastic material which is perforated at perforations 16. The perforations are themselves preferably substantially circular in shape. Substrate 14 is preferably a thermoplastic, and more preferably oriented polypropylene. A suitable commercially available perforated film is PY TM film of W. R. Grace & Co.-Conn. The composition of substrate 14 should be such that at the temperatures required to form the bubbles from first thermoplastic film 12, substrate 14 will not appreciably deform. Some slight deformation can occur, however, as depicted at 26 in FIGS. 2 and 3.

First thermoplastic film 12 is preferably an olefinic material, and more preferably a monolayer film or multilayer film in which a sealant layer is an ethylene vinyl acetate copolymer. A preferred ethylene vinyl acetate copolymer has a relatively high vinyl acetate percent, for example 28%. A particularly preferred film construction for first thermoplastic film 12 is a coextruded film having three layers, with an interior layer of low density polyethylene and one exterior layer of ethylene vinyl acetate copolymer, (4% vinyl acetate by weight) and the other outer layer being an ethylene vinyl acetate copolymer with 28% vinyl acetate by weight.

Figure 4:
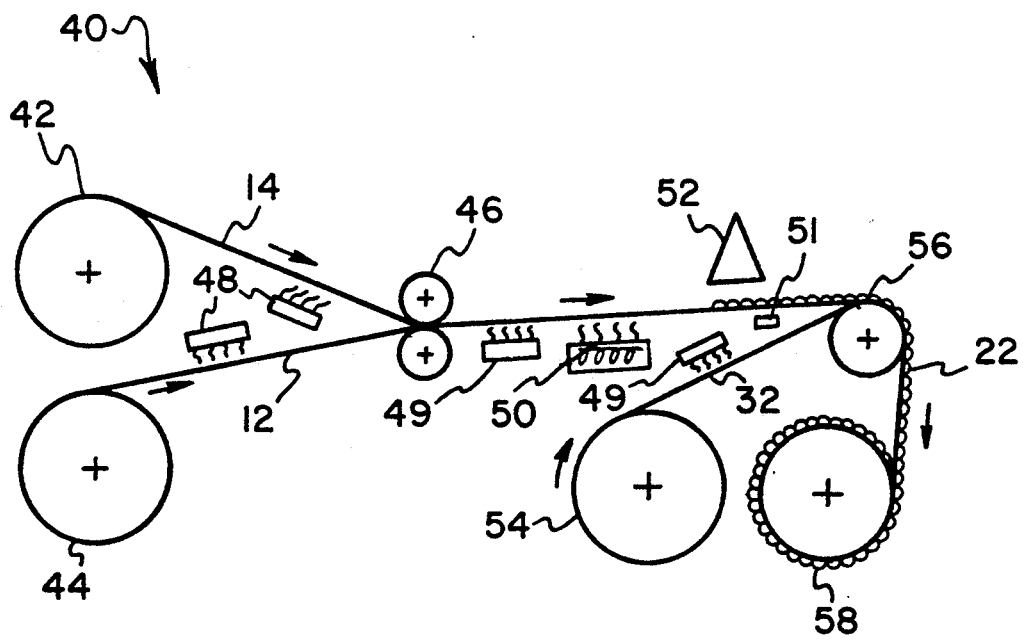
FIG. 4 schematically illustrates the process for making the inventive laminate.

Referring to FIG. 4, in a preferred process and apparatus perforated substrate 14 is fed from a roll 42 towards a pair of nip rolls 46. First thermoplastic film 12 is fed from a roll 44 towards the same pair of nip rolls. These nip rolls are preferably heated, more preferably to a temperature of about 150° F. to bond film 12 to perforated substrate 14.

To assist in forming a good interlaminar bond, facing sides of first thermoplastic film 12 and perforated substrate are corona treated at treating stations 48. In a preferred embodiment, the EVA layer having 28% vinyl acetate by weight, forming part of a three layer film, is the side of the multilayer film treated at treating station 48. This multiply film has preferably been irradiated to cross-link the film structure. Such irradiation provides for better bubble formation.

After the laminate construction of FIG. 1 has been formed at nip rolls 46, the laminate is drawn past a controlled heat source 50. The material is heated preferably to a temperature of about 200° F. The first thermoplastic film 12 in particular is heated and softened as it passes heat source 50.

Figure 2:
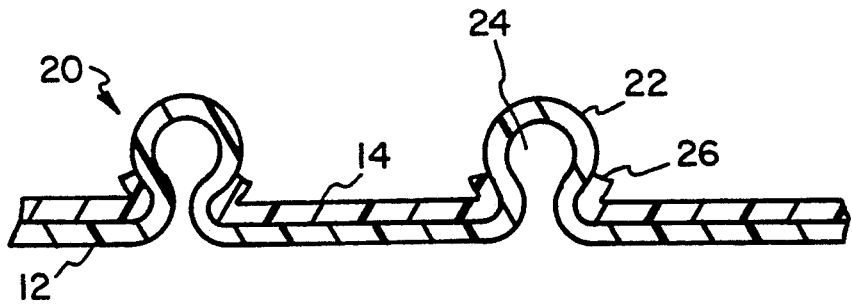
Figure 3:
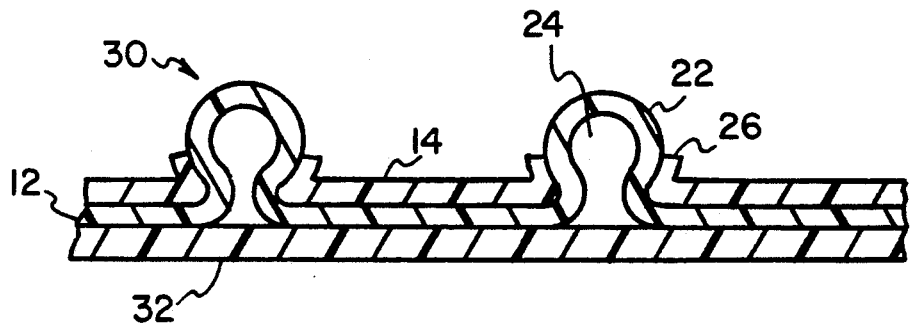

The heated laminate continues past a means for drawing a vacuum 52 where the heated film 12 is drawn up through perforations 16 of perforated substrate 14 to form bubbles 22 (see FIG. 2). During this process, cavities 24 are formed within bubbles 22. Perforated substrate 14 may experience limited deformation 26 at edge portions of layer 14 surrounding perforations 16.

A positive pressure means 51 such as a blower may be used instead of, or in combination with, vacuum means 52. The particular means for drawing heated film 12 through perforation 16 is not critical as long as the bubbles 22 are formed through the perforations by such means.

The "bubble" laminate then passes around roll 56 where a second thermoplastic film 32 is fed from roll 54. Roll 56 is preferably heated, more preferably to a temperature of about 200° F. or more to make a seal.

Film 32 traps bubbles 22 by enclosing them so that air in cavities 24 of bubbles 22 cannot escape. The final micro-bubble laminate construction, shown in FIG. 3, passes to a wind up roll 58.

The present invention offers a simple means of producing an air cushion or bubble laminate, and is especially useful for producing micro-bubbles, i.e. relatively small bubbles controlled by the size of the perforations in perforated substrate 14, the type of material utilized for first thermoplastic film 12, and the amount of vacuumization or other pressure applied to the heated film at station 52.

Many of the negative features of prior air cushion production, including the necessity for intricate and expensive machinery and elaborate embossing rolls, is avoided by the use of the present invention.

Those skilled in the art will understand that modifications to the invention as described in the preferred embodiment can be made without departing from the spirit and scope of the invention. For example, although the first and second thermoplastic films are depicted as monolayers in the drawings, these may include multilayer constructions as well. They may also be either coextruded or laminated products. Perforated substrate 14 may be either a thermoplastic or another material such as a metallic sheet, and it may be of a multilayer construction.

The process of the present invention may also be modified, e.g. by including additional corona treating stations 49 to make a stronger bond between first thermoplastic film 12 and second thermoplastic film 32. In some cases it may not be necessary to corona treat before laminating. Other adhering means are also available, such as the use of adhesives with or without the introduction of heat and pressure to the respective webs.

What is claimed is:

1. A micro-bubble laminate comprising:
   a) a perforated substrate comprising a metallic or thermoplastic web;
   b) a first thermoplastic film adhered to the perforated substrate, and formed by drawing while heated through the perforations of the perforated substrate into gas bubbles protruding up through the perforations of the perforated substrate; and
   c) a second thermoplastic film adhered to the surface of the first thermoplastic film opposite the perforated substrate.

2. The laminate according to claim 1 wherein the perforated substrate is a thermoplastic material.

3. The laminate according to claim 2 wherein the perforated substrate comprises a propylene polymer or copolymer.

4. The laminate according to claim 3 wherein the perforated substrate comprises biaxially oriented polypropylene.

5. The laminate according to claim 2 wherein the perforated substrate comprises a multilayer film.

6. The laminate according to claim 1 wherein the first thermoplastic film comprises a film having a sealant layer of an olefin polymer or copolymer.

7. The laminate according to claim 6 wherein the first thermoplastic film comprises a film having a sealant layer of ethylene vinyl acetate copolymer.

8. The laminate according to claim 1 wherein the first thermoplastic film comprises a multilayer film.

9. The laminate according to claim 1 wherein the second thermoplastic film comprises a film having a sealant layer of an olefin polymer or copolymer.

10. The laminate according to claim 9 wherein the second thermoplastic film comprises a film having a sealing layer of ethylene vinyl acetate copolymer.

11. The laminate according to claim 1 wherein at least one of the perforated substrate, first thermoplastic film, and second thermoplastic film is cross-linked.

12. The laminate according to claim 11 wherein the cross-linking is done by irradiation.

13. The laminate according to claim 8 wherein the first thermoplastic film includes a layer comprising a material of low oxygen permeability.

14. The laminate according to claim 1 wherein the second thermoplastic film includes a layer comprising a material of low oxygen permeability.

* * * * *